(12) United States Patent  
Zeile

(10) Patent No.: US 7,775,221 B2  
(45) Date of Patent: Aug. 17, 2010

(54) VEHICLE AND WATERCRAFT WASH STATION

(75) Inventor: Kim A. Zeile, Clarkston, MI (US)

(73) Assignee: Prefix Corporation, Rochester Hills, MI (US)

( * ) Notice: Subject to any disclaimer, the term of this patent is extended or adjusted under 35 U.S.C. 154(b) by 766 days.

(21) Appl. No.: 11/233,639

(22) Filed: Sep. 23, 2005

(65) Prior Publication Data

US 2006/0157094 A1 Jul. 20, 2006

Related U.S. Application Data

(60) Provisional application No. 60/653,262, filed on Feb. 15, 2005, provisional application No. 60/644,708, filed on Jan. 18, 2005, provisional application No. 60/612,587, filed on Sep. 23, 2004.

(51) Int. Cl. *B08B 3/00* (2006.01)
(52) U.S. Cl. .......................................... 134/123; 134/45
(58) Field of Classification Search .................. 134/45, 134/123; 3/45, 123
See application file for complete search history.

(56) References Cited

U.S. PATENT DOCUMENTS

| | | | | |
|---|---|---|---|---|
| 2,708,446 | A * | 5/1955 | Phillips | 134/93 |
| 3,533,422 | A * | 10/1970 | Constantin | 134/45 |
| 3,766,879 | A | 10/1973 | Jones | |
| 4,030,440 | A | 6/1977 | Wickersham | |
| 4,153,000 | A | 5/1979 | Henderson | |
| 4,869,695 | A | 9/1989 | Sajdak, Jr. | |
| 4,972,862 | A * | 11/1990 | Belanger et al. | 134/123 |
| 5,090,429 | A * | 2/1992 | Barber | 134/57 R |
| 5,111,762 | A | 5/1992 | Frangiamore | |
| 5,732,646 | A | 3/1998 | Brandt | |
| 5,853,494 | A * | 12/1998 | Andersson | 134/10 |
| 6,164,298 | A * | 12/2000 | Petter et al. | 134/104.4 |
| 6,358,330 | B1 * | 3/2002 | McGraw | 134/34 |
| 6,561,202 | B1 * | 5/2003 | Amadio | 134/123 |

OTHER PUBLICATIONS

Website: www.cyclonator.com, www.cyclonator.com/products, www.cyclonator.com/contactus, Mar. 10, 2005.

* cited by examiner

*Primary Examiner*—Michael Barr
*Assistant Examiner*—Jason Y Ko
(74) *Attorney, Agent, or Firm*—Young Basile

(57) ABSTRACT

A wash station for a vehicle is provided which includes a wash housing having a base with a platform as an upper surface. The platform has a plurality of spray nozzles laterally mounted across the platform. A tower having at least one spray nozzle therein is positioned on each lateral side of the platform. The towers are pivotable for pivoting into recesses in the base during transport. A drive-up approaching ramp is connected to the platform for directing the vehicle to the wash housing. The base houses a fresh water reservoir communicating with the spray nozzles. A control unit which may be housed in one of the towers activates the water delivery to the spray nozzles. The platform is configured with angled plates to direct waste water to a flush port or drain and into a waste reservoir in the base. The waste water can be either dispersed or filtered for recirculation. The base includes a pair of side sections and a central section. The pair of side sections are hingedly connected to the central section. The side sections are pivotable about the hinges for disposition on the central section for storage or transport.

29 Claims, 8 Drawing Sheets

US 7,775,221 B2

VEHICLE AND WATERCRAFT WASH STATION

This application claims priority of provisional patent applications: Ser. No. 60/612,587 filed Sep. 23, 2004; Ser. No. 60/644,708 filed Jan. 18, 2005; and Ser. No. 60/653,262 filed Feb. 15, 2005 which are each herein incorporated in their entirety by reference.

BACKGROUND OF THE INVENTION

The invention relates to a vehicle wash station.

An important part of a clean environment is to maintain bodies of water, such as lakes, rivers, etc. free of undesirable aquatic plants, animals, fish, or water related material.

Despite precautions, bodies of water have become contaminated with undesirable animals, larvae, eggs, or plants. Since marine vessels are continually moved between bodies of water, one form of spread of contamination is the transfer of a marine vessel, such as a boat and/or its trailer, from one contaminated body of water to another. Minute plants, animals, fish, and debris, such as mud containing such plants, animals, etc. adhere to the marine vessel or trailer. To prevent the transfer of undesirable aquatic life from a contaminated body of water to a non-contaminated body of water, it is necessary that any portion of a marine vessel and that came into contact with the contaminated water be rinsed clean of such water and any water carried contaminants.

While hoses can be used at lake launch or entry ramps, the water is typically at ambient temperature as it was drawn from the body of water. Further, it is difficult to completely rinse all underside portions of the trailer and vessel, while standing on one side or the other of the trailer.

Thus, what is needed is a wash apparatus which can be employed at boat launch ramps on bodies of water to assure that any contaminants from the body of water are rinsed free of the marine vessel and its trailer.

Besides watercraft, it would also be desirable to provide a wash station which can be used to wash equipment or vehicles at construction, land-management, environmental, agriculture, as well as nautical sites. Besides cleaning such equipment or vehicles by removing dirt and other debris picked up at the site, it would also be desirable to provide a means for preventing the transfer of toxins, fertilizers or other biological or chemical components from one site to another as the equipment and vehicles are moved from site to site.

SUMMARY

It is the intent of the present invention to address the aforementioned concerns. In one aspect of the invention, a portable wash station is provided for a vehicle including motorized vehicles or trailered apparatus, such as a watercraft which is pulled by a tow vehicle. The portable wash station includes a wash housing positionable on a boat ramp. The wash housing has a platform with a plurality of nozzles therein for directing fluid, such as water or cleaning solution to an underside of the trailered apparatus. The nozzles are fluidly connectible to a source of water. The portable wash station also includes at least one drive-up approaching ramp for directing the tow vehicle and the trailered apparatus to the wash housing.

In another aspect of the invention, the portable wash station further includes a control unit communicating with the wash housing for activating water delivery to the nozzles during a wash cycle. The control unit may also include means for distinguishing the trailered apparatus from the towed vehicle and means for actuating the water delivery to the nozzles only when the trailered apparatus is on the platform.

In yet another aspect of the invention, the control unit may include a payment system for authorizing activation of the water delivery to the nozzles.

Further, the portable wash station may include a clean water reservoir and a pump for directing clean water in a reservoir to the nozzles. A heating system for heating the clean water before directing the clean water to the nozzles may be included in the wash housing.

In addition, the portable wash station may include a flush port or drain for directing waste water away from the platform. The flush port or drain may be connected to a waste reservoir which captures the waste water in the wash housing. The wash housing may further include filtration means for cleaning the waste water and also include means for recirculating the filtered water back to the nozzles.

In yet another aspect of the invention, the portable wash station includes a pair of outboard spray towers positionable on lateral sides of the platform wherein each tower includes at least one spray nozzle directed to the opposing tower. The towers may be spring-loaded for selectively allowing each tower to collapse. The wash housing may include at least one recess for receiving each tower for storing the towers during transport.

In yet another aspect of the invention, the controlling unit may be housed in one of the towers.

BRIEF DESCRIPTION OF THE DRAWING

The various features, advantages, and other uses of the present invention will become more apparent by referring to the following detailed description of drawing in which.

DETAILED DESCRIPTION

Figure 1:
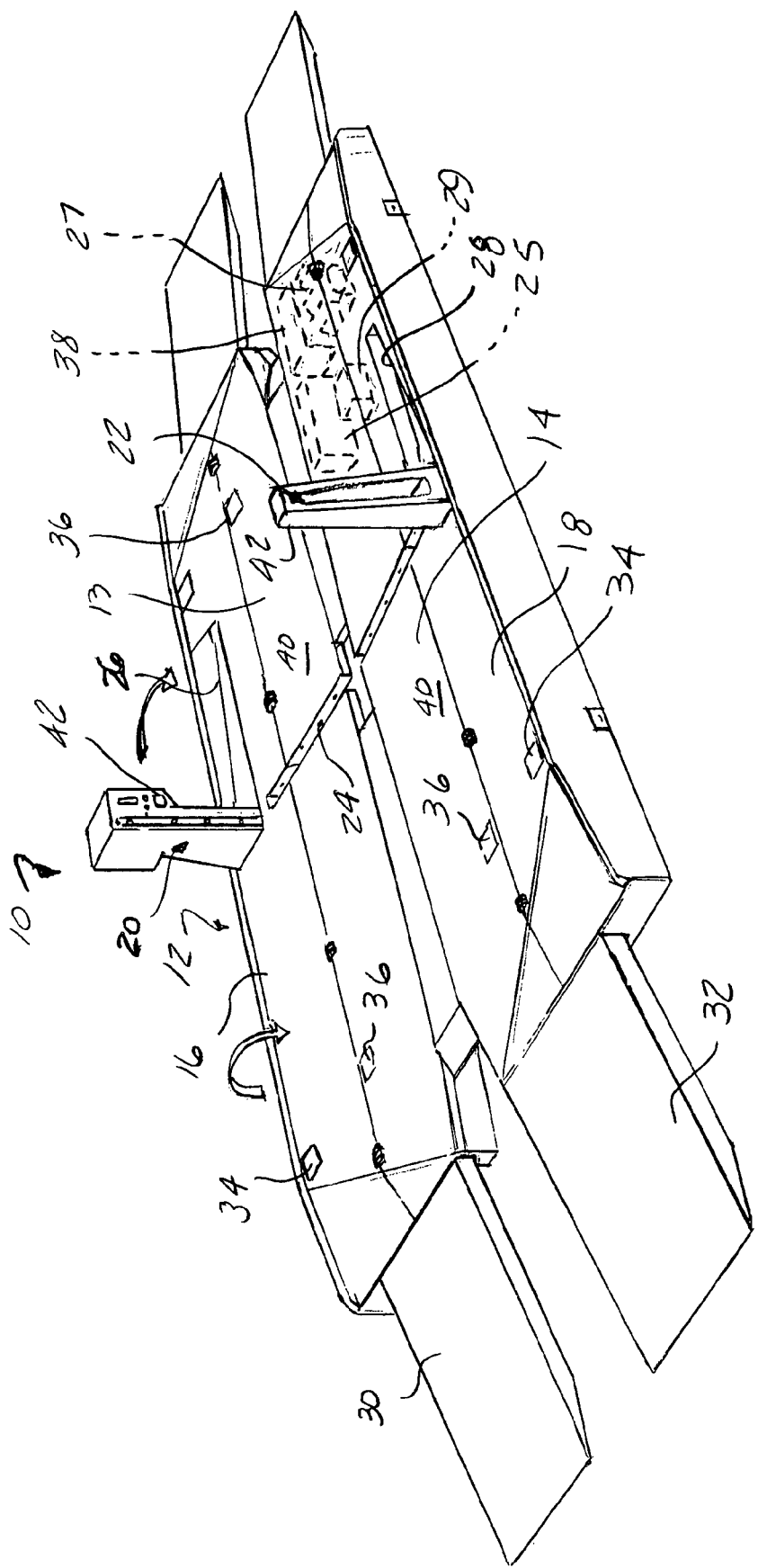
FIG. 1 is a perspective view of one aspect of a wash station.
Figure 2:
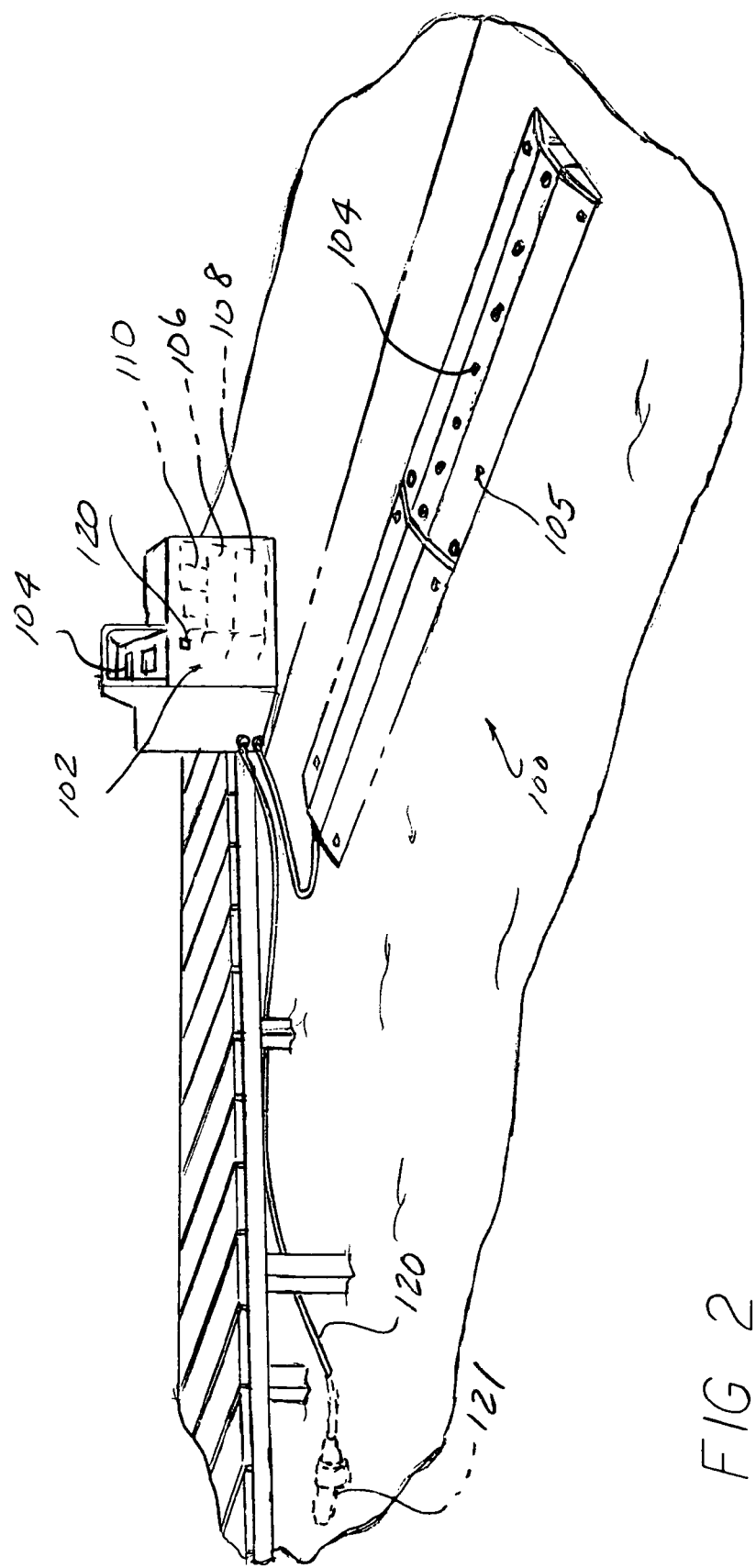
FIG. 2 is a perspective view of another aspect of a wash station.

Although the following description of one example of a wash station described in conjunction with FIGS. 1 and 2 is cleaning watercraft and/or trailers for watercraft, it will be understood that the present wash station may also be employed in other applications to clean other vehicles or equipment, such as construction, land management, environmental or agricultural equipment and/or vehicles and towing trailers for such equipment.

One aspect of a self-contained, transportable wash station 10 that can be placed and set-up at use sites, such as water access sites for example, is shown in FIG. 1. The wash station 10 includes a wash platform 12 with an incorporated water-collecting basin design formed of inward angled plates 13 and 14 which tend to assist in centering the wheels of a towing vehicle and a marine vessel trailer as the vehicle and trailer are driven along the wash platform 12. Side fold out or stationary clean water tanks 16 and 18 are plumbed to two outboard spray towers 20 and 22 and to platform spray nozzles 24 which may be mounted laterally across the platform 12. A tank-less water heating system 25 is plumbed serially with a motor-pump 27, and prior to the spray nozzles 24. Additional spray nozzles 24 may be mounted in each spray tower 20 and 22. Each tower 20 and 22, approximately four foot high, by example, can be stowed for transportation in a recess pocket 26 and 28, respectively, incorporated in the side clean water tanks 16 and 18. For set-up, the spray towers 20 and 22 are unlatched and positioned vertically. The towers 20 and 22 are spring loaded, in one direction, or two opposed directions, allowing for storage during transporting and to allow the independent towers 20 and 22 to collapse if the tow vehicle or trailer should come into contact with the tower 20 and 22 during movement through along the platform 12 in one or either direction. Thus, the towers 20 and 22 may also be spring loaded for bi-directional swinging movement, shown in FIG. 3, instead of the single spring loaded direction movement shown in FIG. 1. Alternately, the towers 20 and 22 maybe removably mounted on the platform 12 by bolts, etc. so as to be removed and shipped loose on the platform 12.

Figure 3:
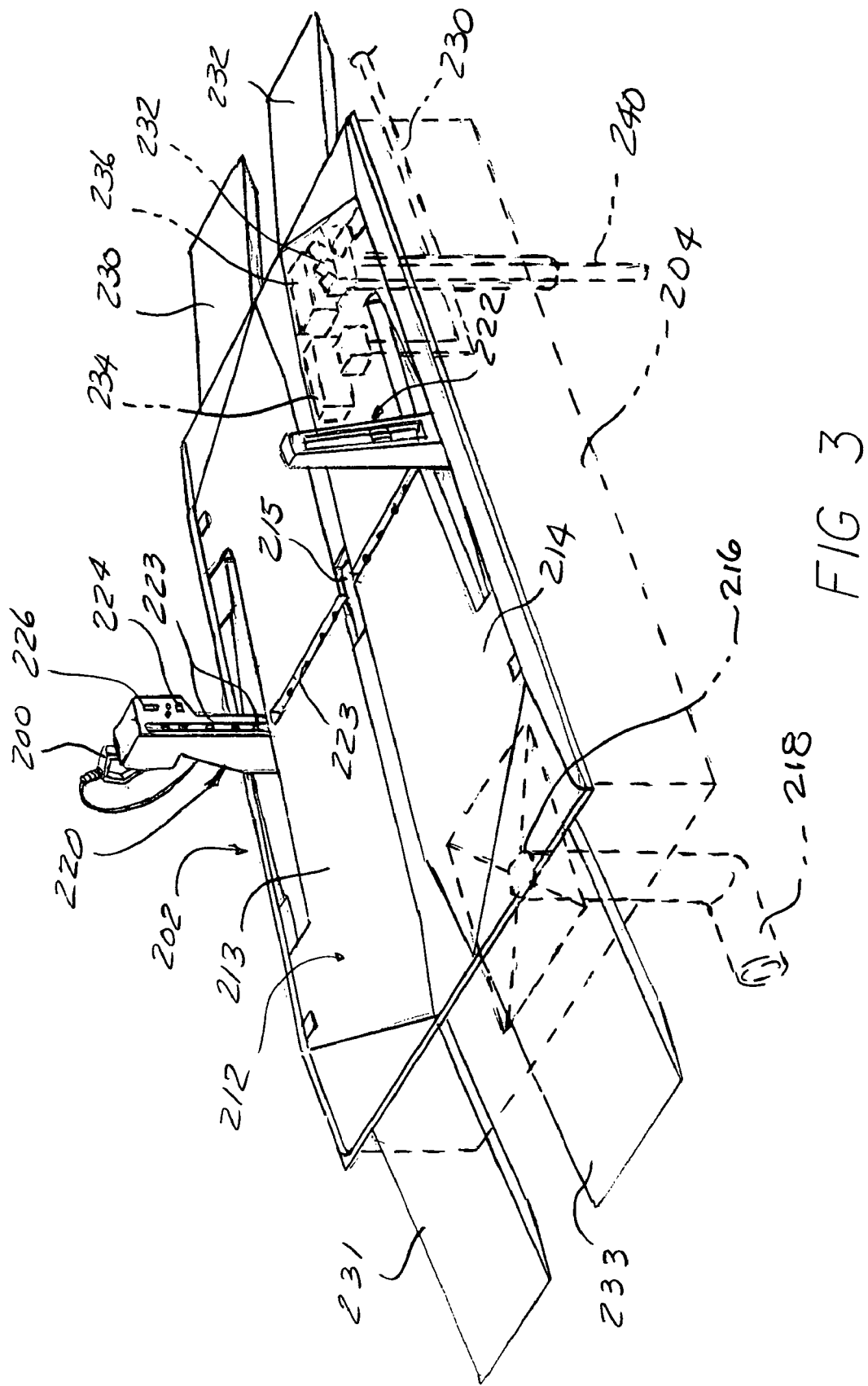
FIG. 3 is a perspective view of another aspect of a wash station.

In addition, the spray nozzles 24 may include a high pressure wand 200 having one or more discharge nozzles at one end, as shown in FIG. 3. The fluid applicator may optionally include a so-called "flushing ear" which is connected to the fluid or water supply and has an attachment which can be coupled to the motor outdrive. This enables clean water to be pumped through the watercraft motor coolant system to remove any aquatic nuisances which may have been picked up during operation of the watercraft.

The wash station 10 is equipped with low inclined ramps 30 and 32 at one or both ends of the wash platform 12 for the tow vehicle and trailer ascent and descent. Alternately, the two ramps 30 and 32 at each end can be replaced by a single large ramp. The ramps or 30 and 32 may be removable from the wash platform 12 or pivotally hinged to the wash platform 12.

The clean water tanks 16 and 18 are equipped with appropriately placed locking fill and flush ports 34 and 36, respectively. The wash platform 12 houses the closed motor-pump 27, a power supply 29, such as a battery or batteries. These are placed subsurface, under the basin near the end of the platform 12. Secured access covers protect the motor and pump.

An enclosed fuel tank 38 located within the platform 12 provides fuel to power the motor 27. The fuel can be any suitable fuel for powering the motor 27. For example, propane gas, natural gas, diesel, or gasoline may be employed. Further, if a source of electricity is located near the use site of the wash station 10, the motor 27 can be an electric motor coupled to the electric power source thereby eliminating need for use of fuel in the fuel tank 38.

Solar powered collectors, batteries, fuel cells, and an electric motor may also be employed, again depending upon the location of the use site of the wash station 10.

The platform 12 is the structure that incorporates the recovery tanks 40, capturing the used water and the contaminants that are sprayed off of the watercraft hull and trailer. Easy access flush ports 36 are placed on the platform 12 allowing for the pumping, draining and flushing of the recovery tanks 40.

All operating directions are appropriately placed on either or both of the towers 20 and 22 and safety reflectors may be adequately placed around, and on the wash station 10. The wash station 10 is appropriately painted and utilizes weather resistant construction materials and design methodology.

Although not shown, a handrail may be positioned above the platform 12 and mounted to the platform 12 by mounted legs.

Alternately, or in combination with the handrail and legs, a side splash curtain formed of plastic, for example, can optionally be mounted on the longitudinal side edges of the platform 12 to contain splash. The upper surface of the curtain or a frame containing the curtain may function as a handrail.

With the use of an issued magnetic swipe card, bar coded cards or other payment token and a matching reader, an electronic network authorizes the wash cycle by the wash station 10. Photocell transmitters and receivers or proximity sensors 42 mounted on the towers 20 and 22, for example, measure the watercraft length for starting and stopping the wash cycle. All electronic circuits and wiring are contained on the interior of the wash station 10 within a weather and water resistant housing. The swipe card system offers a money free activation eliminating any concerns of securing money at remote sites during unpopulated times. Swipe cards may be issued through local authorities along with watercraft registrations or at any predetermined authorized distributor. Swipe cards may be issued or purchased by watercraft owners. Local authorities can monitor the wash station use through the swipe card system and enforce governing laws.

After set-up of the wash station 10, the clean water tanks 16 and 18 are filled with clean water and the motor 27 is fueled. The electronic system is then activated, followed by priming of the plumbing system. The tow vehicle operator approaches the wash station 10 with his or her vehicle and trailer in-line. Driving up the approach ramps 30 and 32, the driver stops at the tower 20 and swipes the assigned swipe card, activating the wash cycle. After swiping of the card, the photocell transmitters and receivers 42 read that the tow vehicle is between the towers 20 and 22. When the tow vehicle proceeds forward, the photocells 42 read the end of the tow vehicle to start the wash cycle.

A fixed or oscillating, high pressure, multi-directional spray pattern is created from the tower and platform spray nozzles 24. This predetermined spray pattern maximizes the direction of heated clean water onto the watercraft and trailer in order to remove most, if not all infectious aquatic nuisances. The driver proceeds forward, pulling the watercraft through the wash station 12. When the watercraft passes completely through the towers 20 and 22, the photocells 42 read the open clearance causing termination of the wash cycle. The majority of the water that is sprayed onto the watercraft drops onto the platform 12 where it is then directed by the platform basin design and collected in the recovery water tanks 40.

Figure 9:
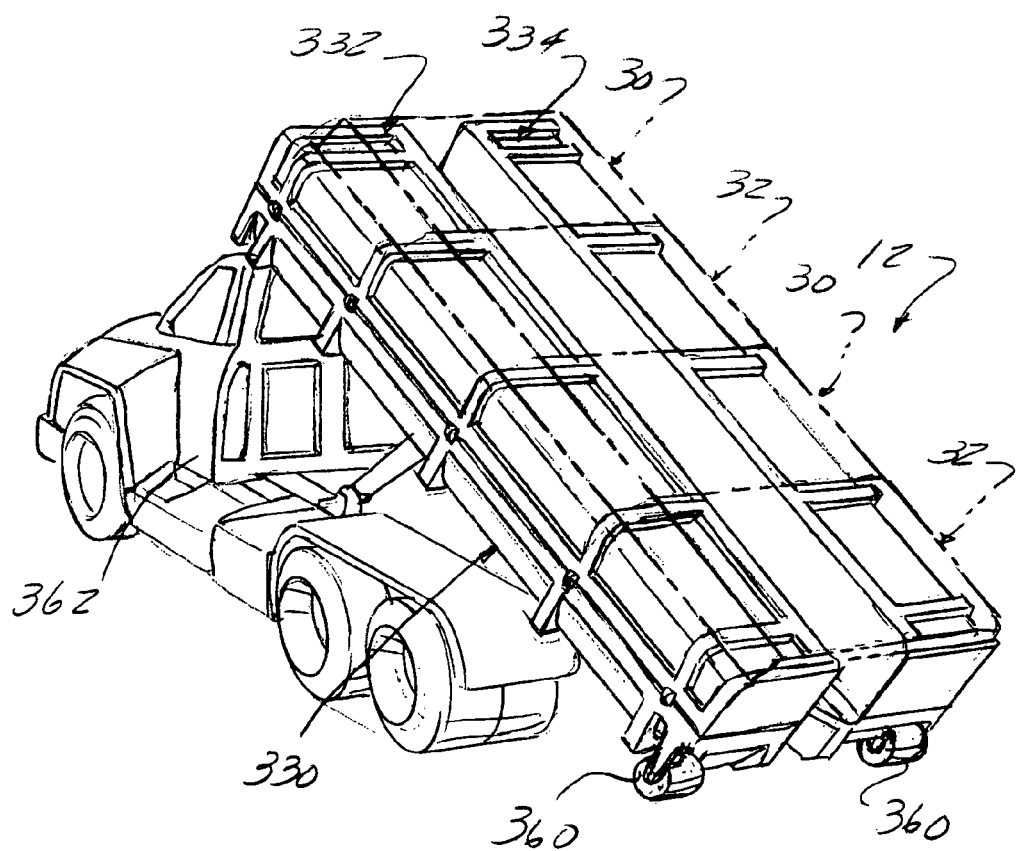
FIG. 9 is a perspective view showing the transport and storage position of the wash station shown in FIGS. 4 and 5.

All of the components of the wash station 10 are formed of weather resistant materials and construction. The platform 12 is easily transportable to any use site by a trailer or truck, as shown in FIG. 9.

In using the swipe card, the control in the master tower 20 may also be connected by wireless communication, hard line, etc. through a network to a central location to enable monitoring of the operation of the wash station 10.

It will also be understood that other means for authorizing use of the wash station by individual watercraft owners may also be employed. For example, conventional currency or paper money acceptance devices may be mounted on the platform 10 or the tower 20, such as on the master tower 20, for accepting currency and bills to enable operation of the wash station 10.

In another aspect shown in FIG. 2, a wash station/housing 100 is devised as a portable unit that will be placed and set-up at water access sites. The wash station 100 consists of two major components, a control unit 102 and a spray nozzle 104. The control unit 102 houses a swipe card panel 104, a motor and pump assembly 106, tank-less water heater 108, water filter system 110 and electrical components. The wash station 100 includes a ground placed, low profile housing 105 in which the spray nozzles 104 are contained. The wash station 100 is positioned and anchored at a water access ramp just above the water surface. Wash 100 are able to accommodate various ramp widths by connecting multiple stations 100 together with an end-to-end connection design.

Plumbing for the wash station 100 consists of a water body draw line 120. The end of the draw line 120 contains a valve 121, which is placed in the actual body of water. The draw line 120 feeds water to the control unit 102 where the water is screened for large elements and filtered for finer particles. This clean water is pumped, heated, and fed to the wash station 100 where it is ejected upward through the spray nozzles 114.

The wash station 100 is appropriately designed for water-craft trailers to cross over it during removal of watercraft from a body of water.

With the use of an issued swipe card through a reader, an electronic network authorizes a wash cycle. All electronics and wiring are contained on the interior of the control unit 102. The swipe card system 104 offers a money free activation, eliminating any concerns of securing money at remote sites during unpopulated times. Swipe cards may be issued through local authorities along with watercraft registrations or at any predetermined authorized distributor. Swipe cards may be issued or purchased by watercraft owners. Local authorities can monitor the wash station use through the swipe card system and enforce governing laws.

After set-up, the wash station 100 is ready for use. The wash station 100 is designed to be used when watercraft are leaving the water on a trailer. After the watercraft is loaded on the trailer, the tow vehicle driver uses the issued swipe card to activate the cycle. The wash commences and terminates through a photo mass sensor 122 on the control unit 102 reading the vehicle position. The tow vehicle proceeds forward pulling the watercraft and trailer through the water spray. The ejected wash consists of a fixed, spray pattern created from the nozzles 104. This predetermined spray pattern maximizes the direction of heated clean water onto the watercraft and trailer in order to remove most, if not all of infectious aquatic nuisances. The clean water that is sprayed onto the watercraft and trailer flows back into the original body of water.

All of the components of the wash station 100 are designed of weather resistant materials and utilize durable weather resistant construction.

The motor, pump, and water heater system may be powered by any suitable fuel, including propane gas, natural gas, diesel, gasoline, etc. stored in a tank in the control unit 102. The motor, pump, and heater system may also be electrically powered from an electrical power source, such as batteries, solar power collectors, fuel cells, or hard wired to a local source of electric power.

Refer now to FIG. 3, there is depicted another aspect of a wash station 202.

The wash station 202 includes a base or enclosure 204 which may be mounted above, below or partially below ground surface for a permanent installation. It will be understood, however, that the base 204 may also be provided as a transportable, self-contained structure.

In an above-ground installation, one or more inclined ramps, such as ramps 231 and 233 may be provided at one or both ends of the base 204 to allow bi-directional access of equipment or vehicles to the wash station 202. The ramp or ramps 231 or 233 may be fixed, pivotally hinged or removably attachable to the base 204.

A wash platform 212 is formed on the upper surface of the base 204 and provided with a water-collection basin design formed of inward angled plates 213 and 214 which tend to assist in centering the wheels of a towing vehicle or a piece of equipment on the base 204 as the vehicle or equipment is driven along the wash platform 212.

One or more drains 215 are formed on the wash platform 212 and receive water from the plates 213 and 214. The drains 215 open to the hollow interior of the base 204. In a permanent installation of the wash station 202, an outlet 216 is formed in the base 204 and establishes fluid communication between the interior of the base 204 and a water outlet conduit or pipe 218. The outlet pipe 218 may be connected to any water drainage system, including a private or municipal septic tank, city sewer, separate storage tank, etc.

One or two side-foldout or stationary spray towers 220 and 222 are mounted on the base 204, intermediate the opposite longitudinal ends of the base 204. Each spray tower 220 and 222 may be spring biased for folding movement in one or two opposed directions to enable the spray towers 220 and 222 to move out of the way in the event that either spray tower 220 and 222 is contacted by the equipment or vehicle as the equipment or vehicle moves across the wash station 202.

The spray towers 220 and 222 may be identical or provided with different fluid application devices. Stationary and/or oscillating spray nozzles 223 may be provided on each spray tower 220 and 222 and laterally across the base 204. Alternately, the high pressure wand 200, described previously, may be mounted in one or both of the spray towers 220 and 222 to enable the user to apply water to any location of the equipment or vehicle on the wash station 202.

A flushing ear may be provided in at least one of the spray towers, such as spray tower 222, for connection to a watercraft motor outdrive for flushing of the motor coolant system.

Automatic actuation determination devices, such as one or more photocells 224, may be mounted on one or both of the spray towers 220 and 222. The photocells 224 activate the water supply system in the wash station 202 upon detecting a forward end of a vehicle or piece of equipment on the wash platform 212. The photocells 224 also detect the passage of the entire length of the vehicle or piece of equipment beyond the spray towers 220 and 222 to terminate the application of water to the spray devices in the spray towers 220 and 222 at the proper time.

An actuation means 226 may be provided for the wash station 202 to enable operation of the wash cycle. As described above, a swipe card reader for acceptance of credit cards magnetic stripe cards, a currency receiving unit a bar code reader for a card carrying a bar code, or simply a push-button or key actuated, lockable on/off switch may be provided on at least one of the spray towers 220 or 222 to enable activation of a wash cycle.

Any of the wash stations 10 and 202 and the wash station 100 may include wireless communication transceivers for remotely reporting wash station operation, credit card validation, etc. to a central station.

As shown in FIG. 3, for a permanent installation of the wash station 202, electrical service is provided to the electrically actuated components of the wash station 202 by connection with electrical power service conductors 230 at the site where the wash station 202 is located. The conductors 230 may be permanent, hard wired conductors from an electrical power source.

The conductors 230 are connected to components in the wash station 202, typically mounted within the interior of the base 203 in a water sealed compartment. Such components include a motor pump unit 232 and an optional water heater 234. A fuel tank 236 may also be mounted within the base 204 to supply fuel to the motor/pump unit 232. Alternately, the motor/pump unit 232 may be an electrically operated motor/pump unit 232 which receives power from the electrical service conductors 230. The conductors 230 are also connected to the photocell 224 and the activation unit 226 on at least one of the spray towers 220 or 222.

As an option to merely discharging all used water drained through the drains 215 and the interior of the base 204 to the sewer or septic tank during each wash cycle, the wash station 202 may be provided with filters, such as a UV filter, a particulate filter, etc. or a water filtration unit and pump which enables some or all of the water collected in the base 204 during a wash cycle to be filtered and recycled as relatively clean water for the next wash cycle. The recycled water can be coupled in parallel to a fresh water inlet 240 which may be connected to a private or municipal water supply system. The fresh water inlet 240 may be used by itself to supply water to the spray towers 220 and 222 when the water filtration and recycled components are not provided in the wash station 202.

The same filters could also be employed in the portable wash station 10 and the wash station 100 to clean the water before it is discharged back into the body of water or surrounding soil.

Figure 4:
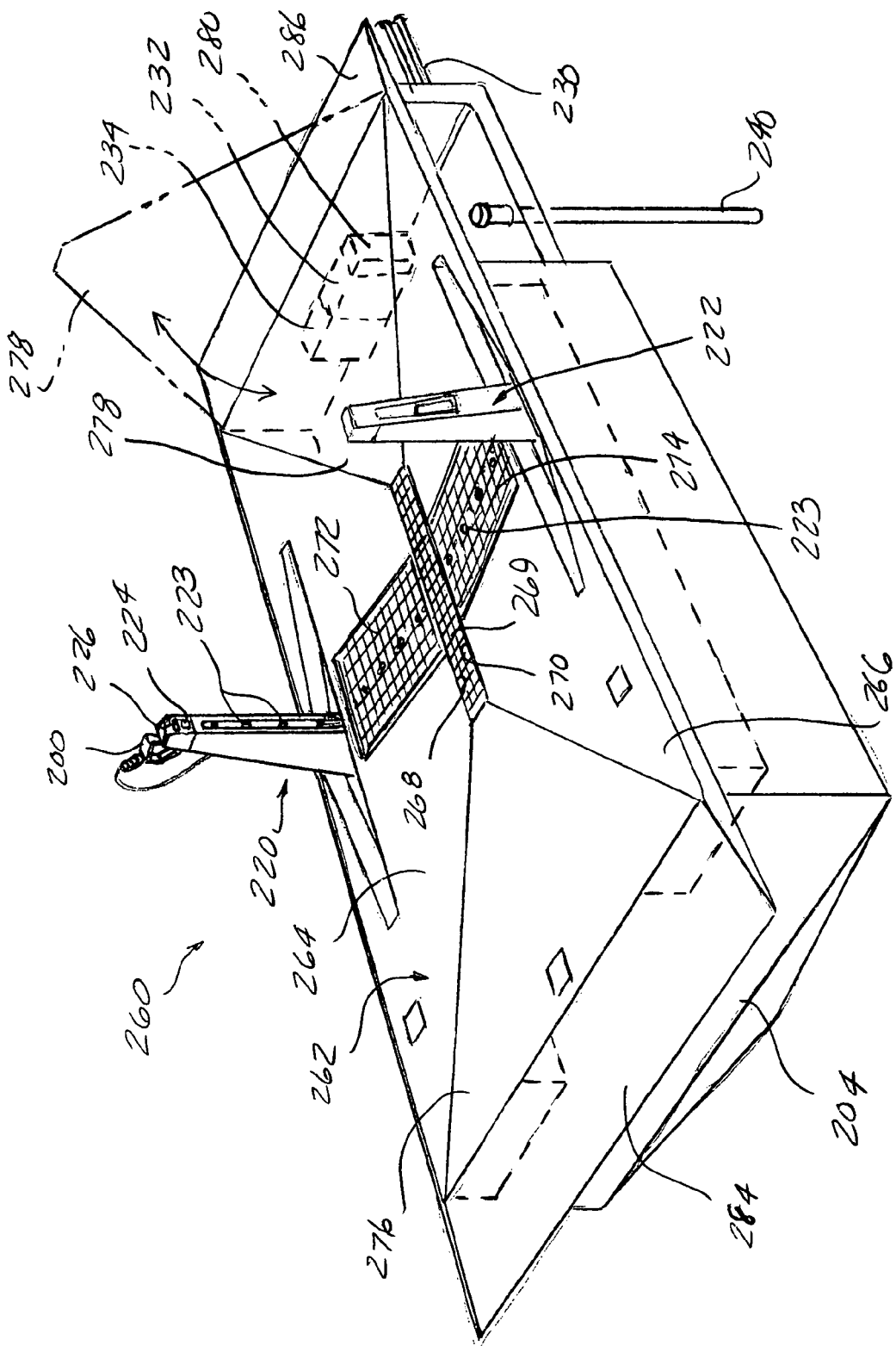
FIG. 4 is a perspective view of a modified aspect of the wash station shown in FIG. 3.

Referring now to FIG. 4, there is depicted a modified wash station 260 which contains modifications to the wash station 202 described above and shown in FIG. 3. The wash station 260 includes a base 204 which acts as a recovery tank for waste water drained through the upper surface of the base, as described hereafter, during a vehicle or watercraft cleaning cycle.

Since the base 204 and the entire wash station 260 is intended for below or partially below ground surface mounting as a permanent installation at a wash site, the base 204 may be provided as a separate transportable structure, apart from the reminding elements of the wash station 260.

A wash platform 262 is mounted on the base 204 and includes a pair of laterally inward inclined plates 264 and 266. The plates 264 and 266 extend laterally inward from both ends of the base 204 and incline from both ends, inward to opposed center edges 268 and 270, respectively, which may be covered by a grate or mesh to form a drain opening 269 to the interior of the recovery tank within the base 204. Each plate 264 and 266 also includes a laterally extending grate 272 and 274 which also opens to the interior of the base 204.

A pair of end access plates or panels 276 and 278 are also mounted on the base 204 and incline downward from the longitudinal ends of the base 204 as shown in FIG. 4. The side edges of each access panel 276 and 278 may be fixedly joined to the mating side edges of the inclined panels 264 and 266 or formed separately therefrom. At least one of the access panels, such as access panel 278, may be pivotally mounted on the base 204 to allow access to a waterproof, sealed compartment within the base 204 which houses the incoming electrical power lines 230, freshwater inlet conduit and conduit connections 240, water recycling filters 280, an electrical motor-pump unit 232 and the water heater 234.

It will be understood that the grates 269, 272, and 274 may open to a collection chamber in the base 204 which is connected by a pipe or conduit to the filters 280. The motor-pump unit 232 serves to draw water draining through the grates 269, 272, and 274 and the interconnecting conduit through the filters 280 and then on to the water heater 234 for reapplication via suitable conduits, not shown, to the spray nozzles 223, wands 200, or other water discharge devices provided on the wash station 260.

An inclined ramp 284 is provided on one end of the base 204. A second inclined ramp 286 may also be provided on the opposite end of the base 204. The ramps 284 and 286 may each be formed of a single member or individual ramp sections, each removably or fixedly attached to one end of the base 204.

The spray towers 220 and 222 are identical to the spray towers employed in the wash station 200 shown in FIG. 3 and, as such, will not be described further. It will be understood that clean water may be discharged from the spray tower 220 and 222 and through the nozzles 223 mounted vertically in each spray tower 220 and 222 and/or through nozzles 223 spaced laterally across the inclined plates 264 and 266 on the base 204 for thorough cleaning of any surface on a vehicle or watercraft disposed on the wash platform 262 or moving slowly across the wash platform 262.

Further, the spray towers 220 and 222 include suitable actuation means 226 which may include all of the various actuation options described above and shown in FIGS. 1-3.

In addition to providing electrical power through the power line 230 to the motor-pump unit 232, the water heater 234 and the circuitry in the spray towers 220 and 222 for operating the photocells 224 and the wash cycle actuation means 226, other sources of electrical power, such as on board or adjacent disposed fuel cells, motor-generators, solar powered battery units, etc. may also be employed.

In operation, water drained through the grates 269, 272, and 274 during a wash cycle will be routed through the filters 280 and the water heater 234 back to the nozzles 223 and the pressure wand 200 or the flushing ear for reapplication to the same or different vehicle or watercraft.

Waste water from a cleaning cycle may be temporarily stored in the interior of the base 204 of the wash station 260 and cleaned, optionally heated, and then supplied to the spray devices only when needed.

Figure 5:
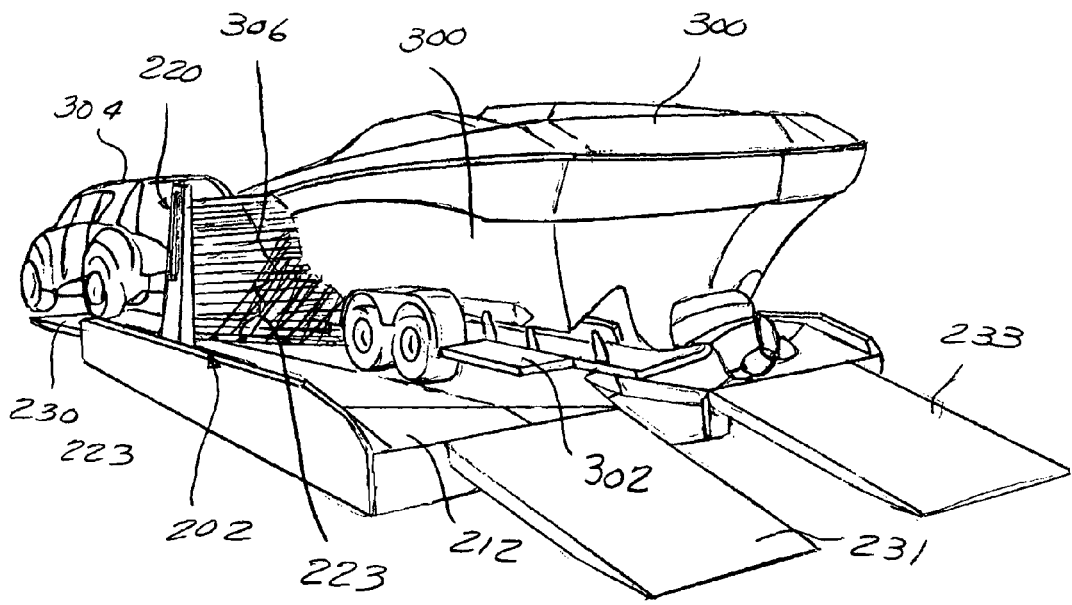
FIG. 5 is a perspective view of the wash station shown in FIG. 1 depicting the cleaning of a watercraft.
Figure 6:
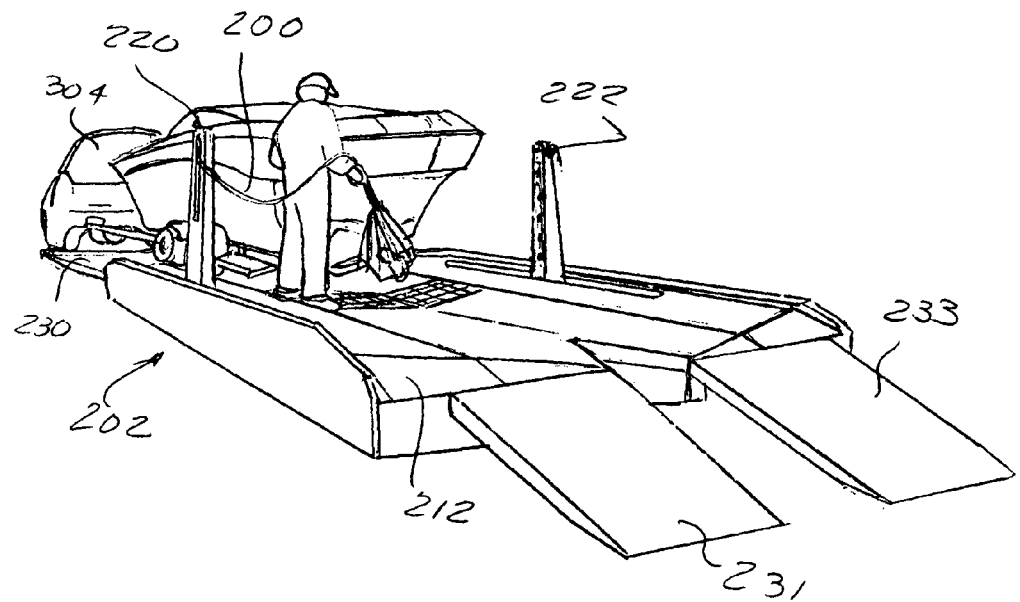
FIG. 6 is a perspective view of the wash station shown in FIG. 1 depicting the use of the spray wand to clean a watercraft.
Figure 7:
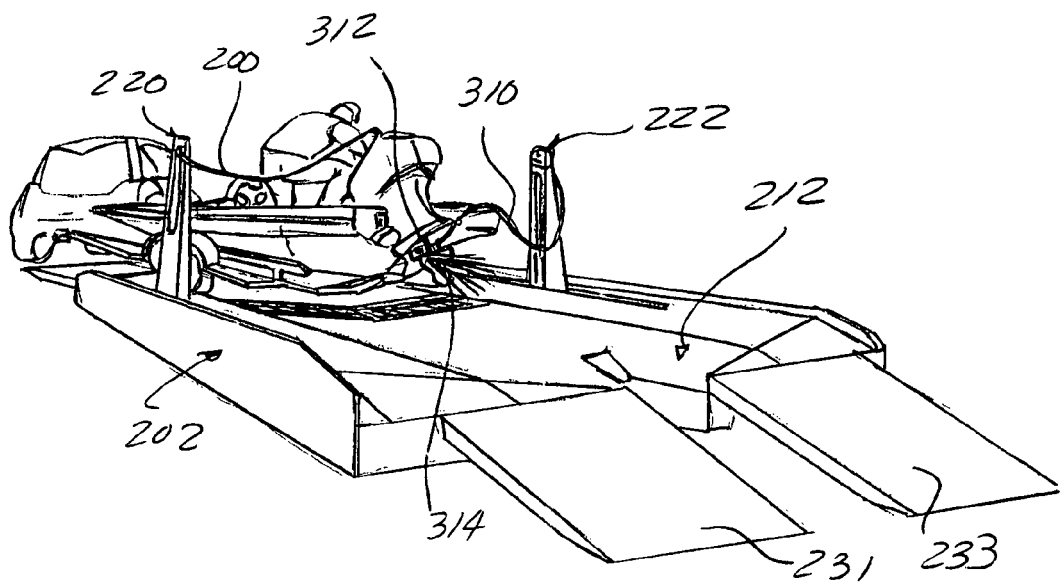
FIG. 7 is a perspective view of the wash station shown in FIG. 1 depicting the use of both wands and a flushing gear attachment on one of the wands to clean portions of a watercraft.

The various uses of the wash station described above can be better understood by referring now to FIGS. 5, 6, and 7.

Although the following description will be provided specifically with reference to the wash station 202 shown in FIG. 2, it will be understood the same principles of operation apply equally to the other wash stations described herein.

It will also be understood that although a watercraft, such as a boat 300 mounted on a wheeled trailer 302 attached to a towing vehicle, such as a motor vehicle 304, shown on the wash station 260, the same wash station 260, without any or any significant modification, can also be used to clean other watercraft, and other vehicles, such as construction equipment, etc.

In a typical wash cycle, the towing vehicle 304 will drive up the ramps 231 and 232 and across the wash platform 212. The photocells in the spray towers 220 and 222 will detect the passage of the towing vehicle 304 therepast and then the presence of the forward end of the watercraft 300 to initiate the wash cycle. The drive means, such as the motor-pump 232 will be activated to pump clean water through the discharge nozzle 223 extending vertically along both of the spray towers 220 and 222 and upward from the laterally spaced nozzles 223 in the wash platform 212 of the wash station 202. This spray pattern as shown by reference number 306 covers substantially all of the exterior surface of the watercraft 300 and even the trailer 302.

FIG. 6 depicts the use of the pressure wand 200 mounted in the spray tower 220 for hand, manual cleaning of an exterior or interior surface of the watercraft 300. The user can stand on the wash platform 212 or on the ground adjacent to the wash station 202 depending upon the size and shape of the watercraft 300.

In FIG. 7, there is depicted the same hand, manual use of the spray wand 200 along with the connection of the flushing ear 310 mounted in the spray tower 222 to the watercraft motor out drive 312. The flushing ear 310 enables pressurized, clean, and optionally heated water to be forced through the cooling system of the watercraft motor for flushing of the entire cooling system through a discharge outlet 314.

Figure 8:
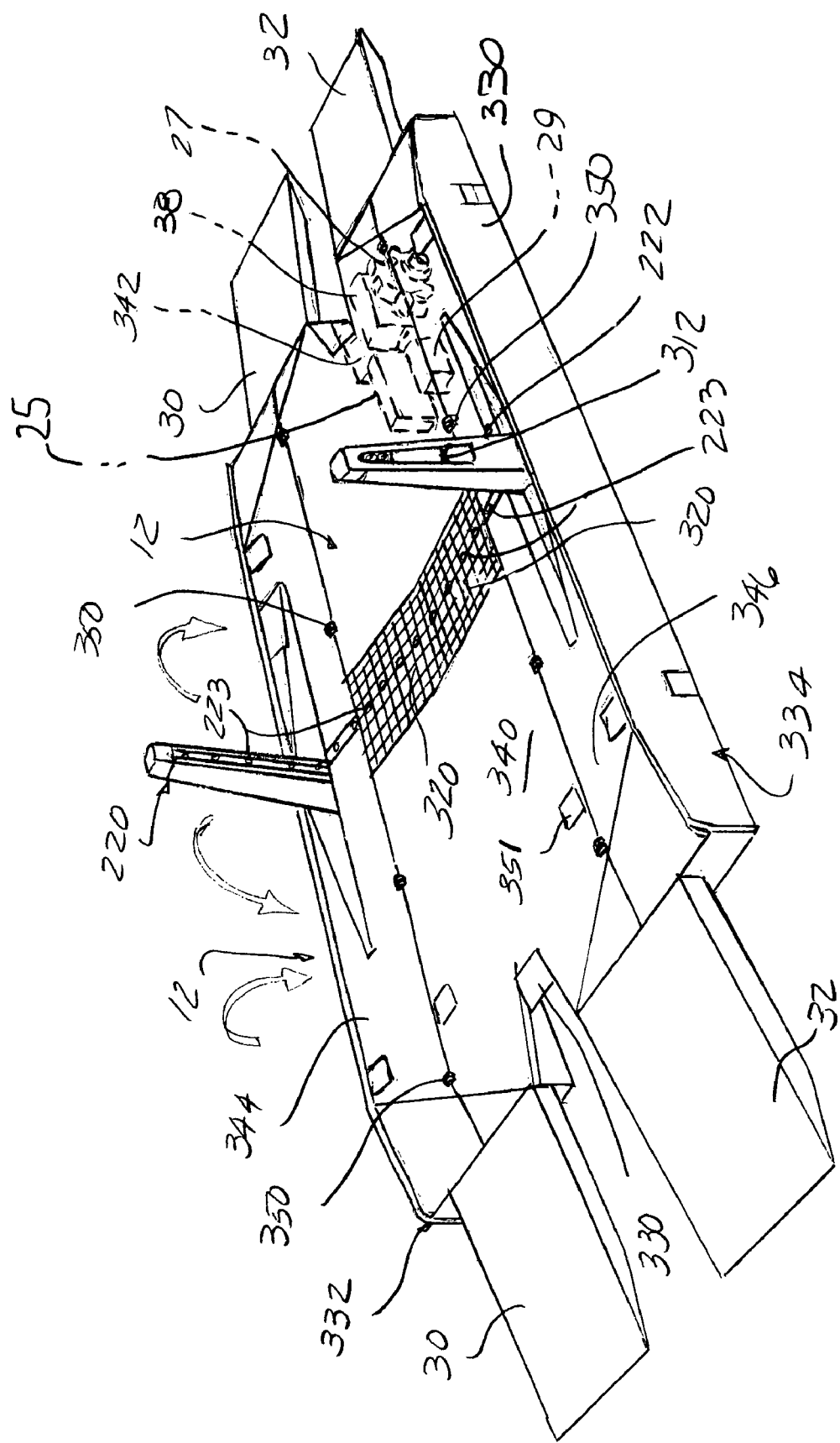
FIG. 8 is a perspective view of another aspect of the wash station shown in FIG. 1.

Referring now to FIGS. 8 and 9 there is depicted another aspect of a wash station which will be described primarily in conjunction with wash station 10 shown in FIG. 1. It will be understood, however, that the following features are also applicable to the wash stations 202 and 260 shown in FIGS. 3 and 4.

The wash station 12 shown in FIGS. 8 and 9 is depicted as having the spray towers 220 and 222 described above and shown in FIGS. 3 and 4 and carrying a pressure wand 200 and/or a flushing ear 310 housed within an interior cavity or chamber when not in use.

Vertically spaced spray nozzles 223 and horizontally spaced spray nozzles 223 are respectively mounted in the spray towers 220 and 222 and laterally across the wash platform 12. The horizontally spaced nozzles 222 project through grates 320 which may be removably mounted in the wash platform 12 or permanently affixed to a central portion of the wash platform 12.

The wash platform 12, in this aspect includes a multisection base formed of a first central base section 330 and a pair of laterally mounted outboard side base portions 332 and 334. The central base portion 330 forms a closed chamber having side and end walls which are closed by an upper panel 340 which inclines laterally downward from opposed side edges to a central longitudinal edge and, optionally, from both end walls so as to drain water dripping or deflecting off of a watercraft during a cleaning cycle to flow through the grates 320 and into the chamber or reservoir formed internally within the central base portion 330.

A sealed compartment is formed in the central base portion 330 for housing the water heater 25, the power supply 29, the fuel tank 38 and the motor-pump unit 27 or other fuel sources, a filtration means 342 which may include UV filters, particulate filters, water filtration unit, etc. suitable piping or conduits, not shown, interconnected between the interior water reservoir chamber in the central base portion 330 through the filter means 342, the motor-pump 27 and the optional water heater 25 to conduits extending to closed chambers formed in each of the side base portions 332 and 334.

The spray towers 220 and 222 are movably mounted in the side base portions 332 and 334 in a permanent fixed manner while being bi-directional swingable in the direction of the arrows for downward movement, substantially flush with an upper surface 344 or 346 of either side base portion 332 and 334, respectively, during storage or transport of the wash station 12.

Fluid connections between the conduits extending from the optional water heater 25 can be of the slide in and/or snap together type.

Each of the side base portions 332 and 334 is pivotally connected by means of one or more hinges 350 to the adjacent side edges of the central base section 330. This enables the side base sections 332 and 334 to be pivoted from a deployed, use position shown in FIG. 8 in which the side base sections 332 and 334 are substantially in line with the central base section 330 such that the upper surfaces 334 and 336 together with the upper surface 340 of the central base section 332 form the wash platform to a folded-up, storage and/or transportable position shown in FIG. 9.

With the clean water reservoirs in the side base sections 332 and 334 drained of water through suitable drains 320 or flush ports 351 formed on the side or bottom of the side base sections 332 and 334 in the central base section 332 similarly drained of waste water, the side base sections 332 and 334 are pivoted about the hinges 350 to a folded up position overlaying the central base section 330 as shown in FIG. 9. It will be understood that the spray towers 220 and 222 have previously been folded downward and latched in a substantially flush position with the upper surfaces 344 and 346 of the side base sections 332 and 334. Alternately, the spray towers 220 and 222 and their respective supporting structure may be physically removed from the side base sections 332 and 334.

Suitable latches may be provided to hold the side base sections 332 and 334 in the folded up positions shown in FIG. 9.

The ramps 30 and 32 at one or both ends of the wash platform 12 are removed and may be mounted on top of the folded up side base sections 332 and 334 and banded or otherwise latched in place for transport or storage with the remainder of the wash platform 12.

As shown in FIG. 9, wheels 360 may be mounted at one end of the central base section 330 to allow the entire wash platform 12 to be easily moved onto or off of a transport vehicle 362 for transport to or from a use site.

When the wash platform 12 reaches the use site, the wash platform 12 is unloaded from the transport vehicle 362. The ramps 30 and 32 are removed from the upper surface of the side base sections 332 and 334 thereby enabling the side base sections 332 and 334 to be pivoted outward to the use position substantially in line with the central base section 330 as shown in FIG. 8. The spray towers 220 and 222 may be unlatched and raised and locked in place in the use position shown in FIG. 8. The ramps 30 and 32 are then reattached to the ends of the wash station as shown in FIG. 8.

Another optional feature of any of the wash stations described above is shown in FIG. 10 and constitutes an overhead rail or support apparatus 380 which carries fluid discharge nozzles 382 in vertical and horizontally spaced positions for discharging cleaning fluid onto the top portion of a vehicle disposed on or moving across the wash station.

Figure 10:
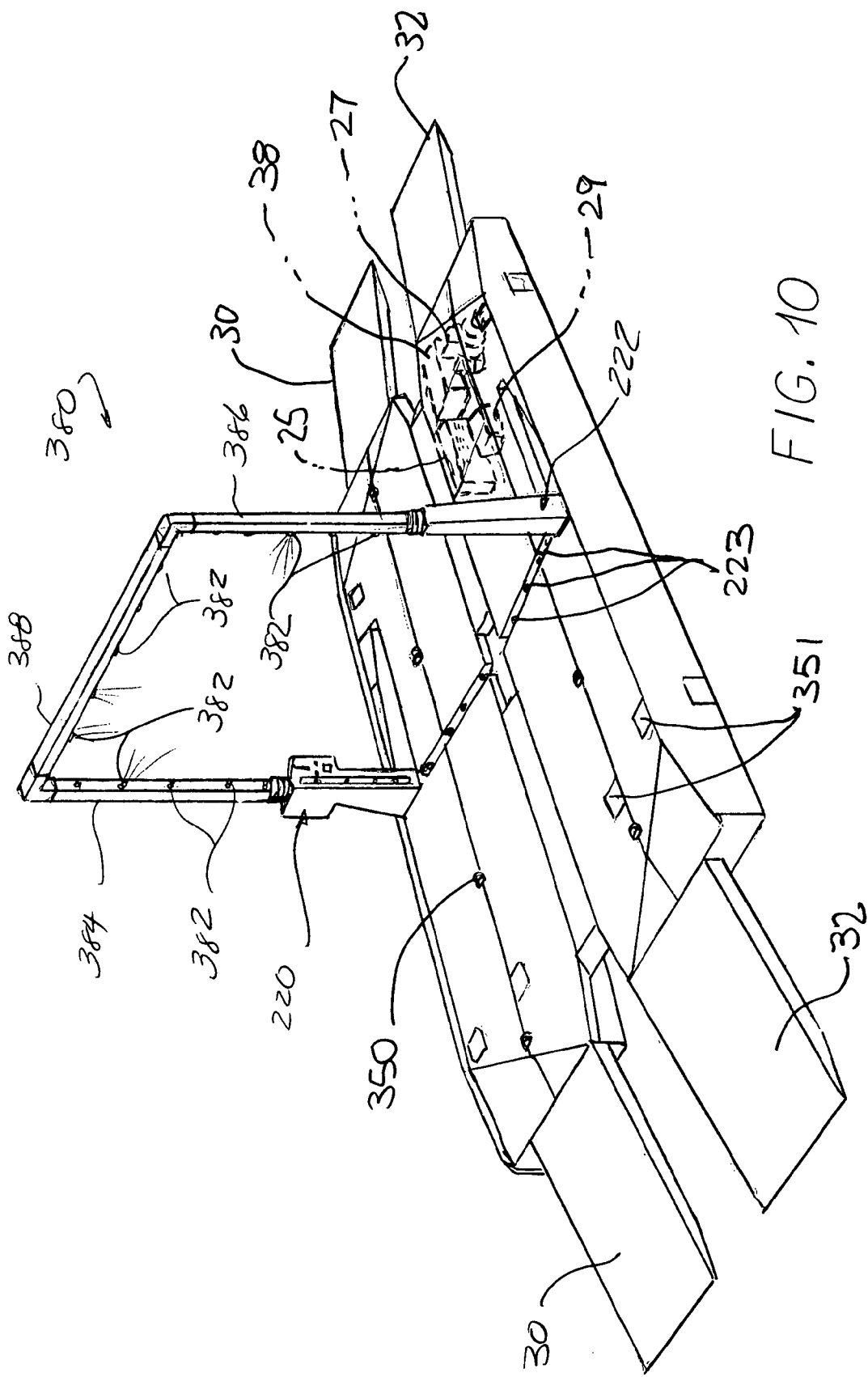
FIG. 10 is perspective view of another aspect of the wash station.

The overhead rail apparatus 380 may include a pair of vertically extending side rails 384 and 386 which are interconnected at one end by one or more horizontally extending cross rails 388. Individual stationary and/or oscillating spray nozzles 382 are mounted in each of the vertically extending side rails 384 and 386 and the horizontal cross rail 388 as shown in FIG. 10.

The side rails 384 and 386 and the cross rail 388 may be hollow to carry a fluid conduit or manifold through the entire overhead rail assembly 380 to provide fluid to the individual nozzles 382. Alternately, the side rails 384 and 386 and the overhead cross rail 388 may support an exteriorly mounted fluid conduit.

It will also be understood that the side rails 384 and 386 and the cross rail 388 may be integrally formed as a one piece assembly or of separate components removably or fixedly interconnected by means of fasteners, interconnecting end profiles, etc. The lower end of the side rails 384 and 386 may be mounted on the wash station by separate mounting means, including a lower support fixed to the wash station in which receives the lower end of one of the side rails 384 and 386 or mounting collar on the lower end of the side rails 384 and 386 which can be releasably attached to the wash station.

Regardless of the mounting means used to mount the overhead rail assembly 380 to the wash station, the mounting means may provide separability of the overhead rail assembly 380 from the wash station to allow for convenient storage or transport of the wash station to and from the use site.

As shown in FIG. 10, the lower ends of the side rails 384 and 386 may be mounted in a fixed or removable manner to the upper ends of the spray towers 220 and 222 by means of slide in, latching or telescoping fittings. The fluid flow conduits or passages extending from the source of cleaning fluid within the wash station base to the spray towers 220 and 222 are sealingly interconnected with the fluid carrying conduit or passage in the side rails 384 and 386 and the cross rail 388 to provide fluid flow from the source of cleaning fluid within the wash station base to the discharge nozzles 382 in the overhead rail assembly 380. This sealing connection may be implemented by slide in fittings to enable the over head rail apparatus 380 to be easily mounted on and removed from the spray towers 220 and 222.

Although the wash station of the present invention is discussed for use with a trailered apparatus being pulled by a tow vehicle, the wash station is usable by any vehicle, motorized or unmotorized vehicles, including, but not limited by, motorcycles, tractors, bicycles, trailers, agricultural equipment, movable construction equipment, land management, environmental and nautical equipment as well as trucks, and automobiles.

What is claimed is:

1. A portable wash station for a vehicle, said portable wash station comprising:
a wash housing, said wash housing having a platform with a plurality of nozzles therein for directing fluid toward a vehicle positioned on the housing, said nozzles fluidly connectable to a source of water; and at least one drive-up approaching ramp connected to the platform for directing the vehicle to the wash housing, wherein the platform of the wash housing is formed of base sections and inward angled plates, wherein the base sections are hinged for selectively folding up over the plates.

2. The portable wash station of claim 1 further comprising:
a drain for directing waste water away from the platform;
a waste reservoir, carried on the wash housing and communicating with the drain, for capturing waste water;
means for cleaning the waste water; and
means for recirculating the cleaned water to the nozzles.

3. The portable wash station of claim 2, further comprising a control unit communicating with the wash housing for actuating water delivery to the nozzles during a wash cycle.

4. The portable wash station of claim 3, wherein the control unit has means for distinguishing the presence of a trailered apparatus from a towing vehicle on the platform.

5. The portable wash station of claim 3, wherein the control unit includes a payment means for authorizing activation of the water delivery to the nozzles.

6. The portable wash station of claim 2, wherein the wash housing carries a clean water reservoir and a pump for directing clean water in the reservoir to the nozzles.

7. The portable wash station of claim 6, wherein the wash housing carries a heating system for heating the clean water before the clean water is directed to the nozzles.

8. The portable wash station of claim 1 further comprising:
a pair of outboard spray towers, each tower located on lateral sides of the platform; each tower including at least one spray nozzle directed to the opposing tower, the at least one spray nozzle in each tower fluidly connectable to the source of water; and
at least one spray tower movably attached to the platform for selectively allowing the at least one spray tower to be folded with respect to the platform for storing the at least one spray tower during periods of non-use.

9. The portable wash station of claim 8, wherein the wash housing includes at least one recess in the platform for each tower for storing said towers during transport.

10. The portable wash station of claim 8, further comprising a control unit communicating with the wash housing for actuating water delivery to the nozzles during a wash cycle, wherein the control unit is housed in at least one of the towers.

11. The portable wash station of claim 2, wherein the wash housing houses a motor pump, and a means for powering the motor pump.

12. The portable wash station of claim 2, wherein the drain is connectable to a water outlet conduit connectable to a water drainage system external to the housing.

13. The portable wash station of claim 3, wherein the control unit has means for distinguishing the presence of the vehicle and wherein the wash station includes a pair of spray towers, each tower positioned on lateral sides of the platform, wherein the means for distinguishing presence of the vehicle includes photocells mounted in at least one spray tower.

14. The portable wash station of claim 13 wherein when the photocells detect a forward end of the vehicle, the control unit actuates water delivery to the nozzles and when the photocells detect the passage of the entire length of the vehicle, the water delivery to the nozzles is terminated.

15. The portable wash station of claim 2, further comprising an overhead rail having spray nozzles mounted therein, wherein the spray nozzles fluidly communicate with the source of water.

16. The portable wash station of claim 3, wherein the control unit has a draw conduit for communicating between a remote source of water and the nozzles, wherein the control unit further includes a pump for drawing water through the draw conduit to the nozzles.

17. The portable wash station of claim 4, further comprising means for activating water delivery to the nozzles only after the towing vehicle leaves the platform and when the trailered apparatus is on the platform.

18. The portable wash station of claim 11, wherein the means for powering the motor pump includes a power source chosen from one of a battery, AC source, fuel cell, solar power and a fuel source.

19. The portable wash station of claim 2, wherein the at least one drive-up approaching ramp is pivotal relative to the platform.

20. The portable wash station of claim 2, wherein the at least one drive-up approaching ramp is one of removably attachable to the platform or fixed to the platform.

21. The portable wash station of claim 8, further comprising a spray wand fluidly communicating with a flushing ear mounted in at least one of the towers for flushing a cooling system in the vehicle.

22. The portable wash station of claim 2, further comprising at least a pair of wheels mounted at one end of the platform for facilitating disposition and removal of the portable wash station on and off a transport vehicle.

23. The portable wash station of claim 2, further comprising at least one of a pump for directing water to the nozzles, a heater for heating the water to the nozzles, a filtration means for cleaning the water to the nozzles and a control unit for actuating water delivery to the nozzles.

24. The portable wash station of claim 23, further comprising a power source for powering the at least one of a pump, a heater, a filtration means and a control unit, said power supply including at least one of solar powered collectors, a battery, a fuel cell, an AC source, and a fuel source.

25. The portable wash station of claim 4, wherein the wash station includes a pair of spray towers, each tower positioned on lateral sides of the platform, wherein the means for distinguishing the presence of the trailered apparatus includes photocells mounted in at least one spray tower.

26. The portable wash station of claim 25 wherein when the photocells detect a forward end of the trailered apparatus, the control unit activates water delivery to the nozzles and when the photocells detect the passage of the entire length of the trailered apparatus, the water delivery to the nozzles is terminated.

27. The portable wash station of claim 12, wherein the overhead rail includes a pair of vertically extending side rails interconnected to a horizontal cross rail therebetween, and wherein spray nozzles are mounted in at least one of the vertically extending side rails and the horizontal cross rail.

28. The portable wash station of claim 2, wherein the platform incorporates a clean water tank and a water recovery tank, the water recovery tank communicating to an upper surface of the platform via a drain.

29. A portable wash station for a vehicle, said wash station comprising:
- a wash housing having a platform forming an upper surface of a base with a plurality of spray nozzles laterally mounted across the platform, said nozzles fluidly connectable to a source of water;
- at least one drive-up approaching ramp for leading the vehicle to the wash housing;
- a control unit for actuating water delivery from the source of water to the nozzles during a wash cycle;
- two outboard spray towers, each tower mounted on lateral sides of the platform, said towers having at least one spray nozzle mounted in each spray tower;
- a clean water tank plumbed to all the spray nozzles;
- at least one drain in the platform, said platform formed by inclined plates directing fluid to the at least one drain, said at least one drain opened to a hollow interior of the base, wherein the base includes side base portions and a central base portion and wherein the side base portions are hingedly and pivotally connected to the central base portion for folding up for storage and transport.

* * * * *